US008919698B2

(12) United States Patent
Kim et al.

(10) Patent No.: US 8,919,698 B2
(45) Date of Patent: Dec. 30, 2014

(54) TRANSLATING DOOR CENTERING SYSTEM (75) Inventors: Sun Gil Kim, Sammamish, WA (US);
Eddie Daryl Banks, Renton, WA (US);
Kurt Poechlauer, Everett, WA (US)

(73) Assignee: The Boeing Company, Chicago, IL (US)

(*) Notice: Subject to any disclaimer, the term of this patent is extended or adjusted under 35 U.S.C. 154(b) by 1790 days.

(21) Appl. No.: 12/185,201

(22) Filed: Aug. 4, 2008

(65) Prior Publication Data
US 2010/0024305 A1 Feb. 4, 2010

(51) Int. Cl.
*B64C 1/14* (2006.01)

(52) U.S. Cl.
USPC .................................................. 244/129.5

(58) Field of Classification Search
USPC ........ 244/129.5, 129.4; 49/394, 395, 69, 221, 49/235, 248–249; 16/68, 50
See application file for complete search history.

(56) References Cited

U.S. PATENT DOCUMENTS

| | | | |
|---|---|---|---|
| 3,051,280 A * | 8/1962 | Wood et al. | 49/249 |
| 3,791,073 A * | 2/1974 | Baker | 49/249 |
| 4,720,065 A * | 1/1988 | Hamatani | 244/129.5 |
| 5,289,615 A | 3/1994 | Banks et al. | |
| 5,305,969 A * | 4/1994 | Odell et al. | 244/129.5 |
| 5,823,473 A * | 10/1998 | Odell et al. | 244/129.5 |
| 6,151,755 A | 11/2000 | Rozema | |
| 6,655,634 B2 * | 12/2003 | Erben et al. | 244/129.5 |

* cited by examiner

*Primary Examiner* — Tien Dinh
(74) *Attorney, Agent, or Firm* — Yee & Associates, P.C.

(57) ABSTRACT

A method and apparatus for a tracking door centering system. An apparatus may comprise an elongate member, a first centering track, and a second centering track. The elongate member may have a first end and a second end capable of being rotatably mounted to a door along an axis that may be substantially parallel to a horizontal centerline. The first centering track may be mounted on the first end. The second centering track may be mounted on the second end. The first centering track and the second centering track may be movable to reduce rotational movement of the door during movement of the door about a vertical centerline when a first follower is engaged in the first centering track and a second follower is engaged in the second centering track.

18 Claims, 6 Drawing Sheets

TRANSLATING DOOR CENTERING SYSTEM

BACKGROUND INFORMATION

1. Field

The present disclosure relates generally to a door and in particular to a translating door. Still more particularly, the present disclosure relates to a translating door in an aircraft.

2. Background

Commercial aircraft may have a fuselage with a number of different openings to allow for the movement of passengers and/or cargo egress in and out of the aircraft. These openings may include doors to provide for the closure of the openings during flight. The doors used in the aircraft may vary in terms of construction and operation.

A commonly used door may be a plug door. A plug door may be a door designed to fit into the opening such that when the door is closed, a substantially smooth, continuous, uninterrupted exterior skin surface may be present. When these types of doors are opened, the doors may move through a number of different paths depending on the particular door design used.

For example, without limitation, some aircraft doors may move inwardly into the aircraft and slide upwardly along tracks deployed on the interior of the fuselage. This door may be received within a compartment immediately above the ceiling of the passenger cabin.

In other aircraft, a door may be pivoted and moved slightly inboard and then moved outwardly through the opening. This type of door may swing or move in an arc that is around 180 degrees. As a result, when this type of door is fully opened, the door may be entirely located outside of the aircraft fuselage. The outer skin of the door may be in face to face contact with the outer skin of the fuselage.

In yet another design, the door may be capable of a translating motion. The door may translate or move outwardly. When the door is fully opened, the door may occupy a position in which the interior surface of the door may be facing the exterior skin of the fuselage. With this type of door, the movement is moved about a vertical and/or near vertical hinge axis.

This final type of outwardly opening translatory door may provide a number of different challenges in opening and/or closing the door. It may be desirable to avoid contact between the door and the fuselage of the aircraft during opening and/or closing of the door.

This type of translating movement may be provided through different mechanisms and/or structures to maintain the door in a parallel position to the opening for the door during movement of the door between a closed position and an open position. Particularly during initial opening and/or final closing, with the door close to the adjacent fuselage, tighter control of the door may be needed than that provided by the overall translating mechanism. Currently used mechanisms for this tighter control may be complex, heavy, ineffective, and/or expensive.

Therefore, it would be advantageous to have a method and apparatus that overcomes the problems described above as well as possibly other problems.

SUMMARY

The advantageous embodiments provide a method and apparatus for a tracking door centering system. In one advantageous embodiment, an apparatus may comprise an elongate member, a first centering track, and a second centering track. The elongate member may have a first end and a second end capable of being rotatably mounted to a door along an axis that may be substantially parallel to a horizontal centerline. The first centering track may be mounted on the first end. The second centering track may be mounted on the second end. The first centering track and the second centering track may be movable to reduce rotational movement of the door about a vertical centerline during movement of the door when a first follower is engaged in the first centering track and a second follower is engaged in the second centering track.

In another advantageous embodiment, a method of moving a door may be present. The door may be moved relative to an opening. Rotational movement of vertical edges of the door relative to vertical edges of the opening may be limited while a track system for the door is engaged during movement of the door.

In yet another advantageous embodiment, an apparatus may comprise a door, a torque tube, a set of bearings, a first centering track, a second centering track, a first follower, a second follower, and a biasing mechanism. The door may have a first vertical edge and a second vertical edge. The torque tube may have a first end and a second end capable of being rotatably mounted to the door along an axis that is substantially parallel to a horizontal centerline. The torque tube may have a cross section shape selected from one of a circle or a polygon. The set of bearings may be capable of being mounted to the door and capable of rotatably holding the torque tube. The first centering track may be mounted on the first end, wherein the first centering track may be located at the first vertical edge. The second centering track may be mounted on the second end, wherein the second centering track may be located at the second vertical edge. The first follower may be located in a first wall in an opening in a vehicle that may be substantially parallel to the first vertical edge. The second follower may be located in a second wall in the opening of the vehicle that is substantially parallel to the second vertical edge. The biasing mechanism may be capable of maintaining the first centering track and the second centering track in a position to receive the first follower and the second follower when closing the door. The biasing mechanism may comprise a spring and a stop. The first centering track and the second centering track may be movable to reduce rotational movement of the door about a vertical centerline during movement of the door when the first follower is engaged in the first centering track and the second follower is engaged in the second centering track such that a relationship between the first vertical edge and the second vertical edge of the door to the opening may be maintained during the movement of the door when the first follower is engaged in the first centering track and the second follower is engaged in the second centering track. The rotational movement of the door along a second axis substantially parallel to a hinge axis may be reduced, and contact between the first vertical edge and the second vertical edge with the first wall and the second wall of the opening caused by the horizontal movement of the first vertical edge and the second vertical edge of the door may be prevented. The vehicle may be selected from one of an aircraft, a submarine, a bus, a train, an automobile, a spacecraft, and a surface ship.

In still yet another advantageous embodiment, a method may be present for moving an aircraft door relative to an opening in an aircraft. The aircraft door may be moved with a translational movement relative to the opening. Rotational movement of vertical edges of the aircraft door relative to vertical edges of the opening may be limited while a track system for the aircraft door is engaged during movement of the aircraft door. The track system may comprise an elongate member having a first end and a second end capable of being rotatably mounted to the aircraft door along an axis that may be substantially parallel to a horizontal centerline. A first centering track may be mounted on the first end, wherein the first centering track may be located at a first vertical edge of the aircraft door. A second centering track may be mounted on the second end, wherein the second centering track may be located at a second vertical edge. A first follower may be located in a first wall in the opening that is substantially parallel to the first vertical edge. A second follower may be located in a second wall in the opening that may be substantially parallel to the second vertical edge. Contact between the vertical edges of the aircraft door and the vertical edges of the opening caused by horizontal movement of the vertical edges of the aircraft door may be prevented.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
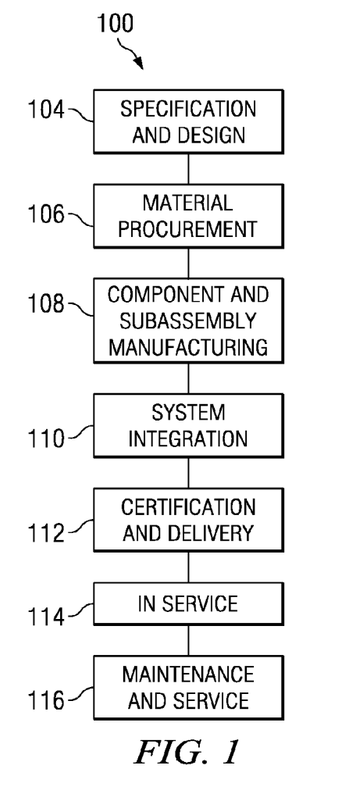
FIG. 1 is a flow diagram of an aircraft production and service methodology in which an advantageous embodiment may be implemented.
Figure 2:
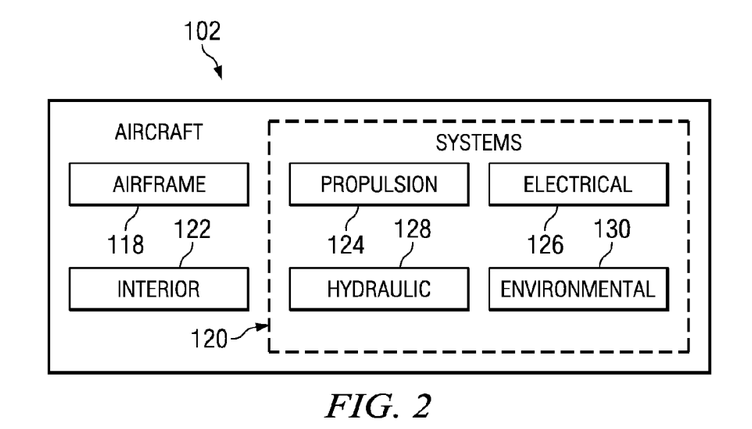
FIG. 2 is a block diagram of an aircraft in accordance with an advantageous embodiment.

Referring more particularly to the drawings, embodiments of the disclosure may be described in the context of aircraft manufacturing and service method 100 as shown in FIG. 1 and an aircraft 102 as shown in FIG. 2. During pre-production, aircraft manufacturing and service method 100 may include specification and design 104 of aircraft 102 and material procurement 106.

During production, component and subassembly manufacturing 108 and system integration 110 of aircraft 102 takes place. Thereafter, aircraft 102 may go through certification and delivery 112 in order to be placed in service 114. While in service by a customer, aircraft 102 is scheduled for routine maintenance and service 116 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of vendors, subcontractors, and suppliers; and an operator may be an airline, leasing company, military entity, service organization, and so on.

As shown in FIG. 2, aircraft 102 produced by aircraft manufacturing and service method 100 may include airframe 118 with a plurality of systems 120 and interior 122. Examples of systems 120 include one or more of propulsion system 124, electrical system 126, hydraulic system 128, and environmental system 130. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 108 may be fabricated or manufactured in a manner similar to components or subassemblies produced while aircraft 102 is in service.

Also, one or more apparatus embodiments, method embodiments, or a combination thereof may be utilized during component and subassembly manufacturing 108 and system integration 110, for example, without limitation, by substantially expediting assembly of or reducing the cost of aircraft 102. Similarly, one or more of apparatus embodiments, method embodiments, or a combination thereof may be utilized while aircraft 102 is in service, for example, without limitation, to maintenance and service 116. In these illustrative examples, a translating door centering system may be employed during component and subassembly manufacturing 108 and/or maintenance and service 116.

The different advantageous embodiments recognize and take into account that an existing translating door requires a mechanism to keep the door parallel to the opening or cutout. The different advantageous embodiments recognize and take into account that these types of mechanisms may provide too much flexibility in the initial outward opening and/or final inward closing of a door. The different advantageous embodiments also recognize and take into account that this flexibility may allow the door to rotate rather than translate. The different advantageous embodiments recognize and take into account that this type of rotation is undesirable and may cause undesirable contact, difficulty opening the door, difficulty closing the door, and/or other undesirable situations.

The different advantageous embodiments recognize that one solution may be to employ a set of guides with rollers to limit the forward and aft movement of the door. The different advantageous embodiments recognize another solution may involve stiffening the hinge mechanism and/or linkages to reduce rotation about the hinges axes.

The different advantageous embodiments, however, recognize and take into account that these types of proposed solutions may be marginally effective because a small amount of rotation about the hinge axis may result in a large forward and/or aft movement of the door relative to the door edges. The different advantageous embodiments recognize and take into account that the space constraints may increase the difficulty in obtaining the desired spacing between the door and the opening.

Figure 3:
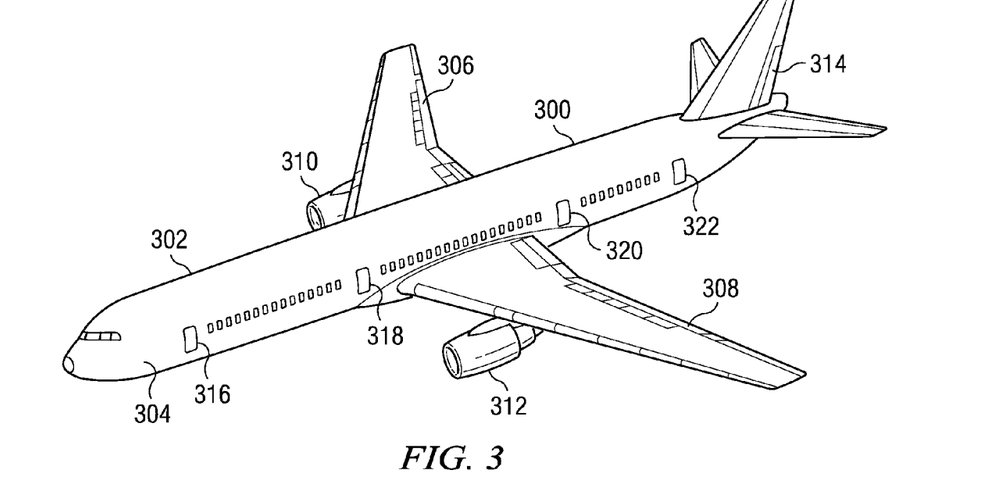
FIG. 3 is a diagram of an aircraft in accordance with an advantageous embodiment.

With reference next to FIG. 3, a diagram of an aircraft is depicted in accordance with an advantageous embodiment. In this example, aircraft 300 is an example of one implementation of aircraft 200 in FIG. 2. Aircraft 300 may have fuselage 302 with outer surface 304. Aircraft 300 also may have wing 306, wing 308, engine 310, engine 312, and tail 314. In this example, fuselage 302 may have doors 316, 318, 320, and 322. These doors may take the form of a translating door in accordance with an advantageous embodiment.

Figure 4:
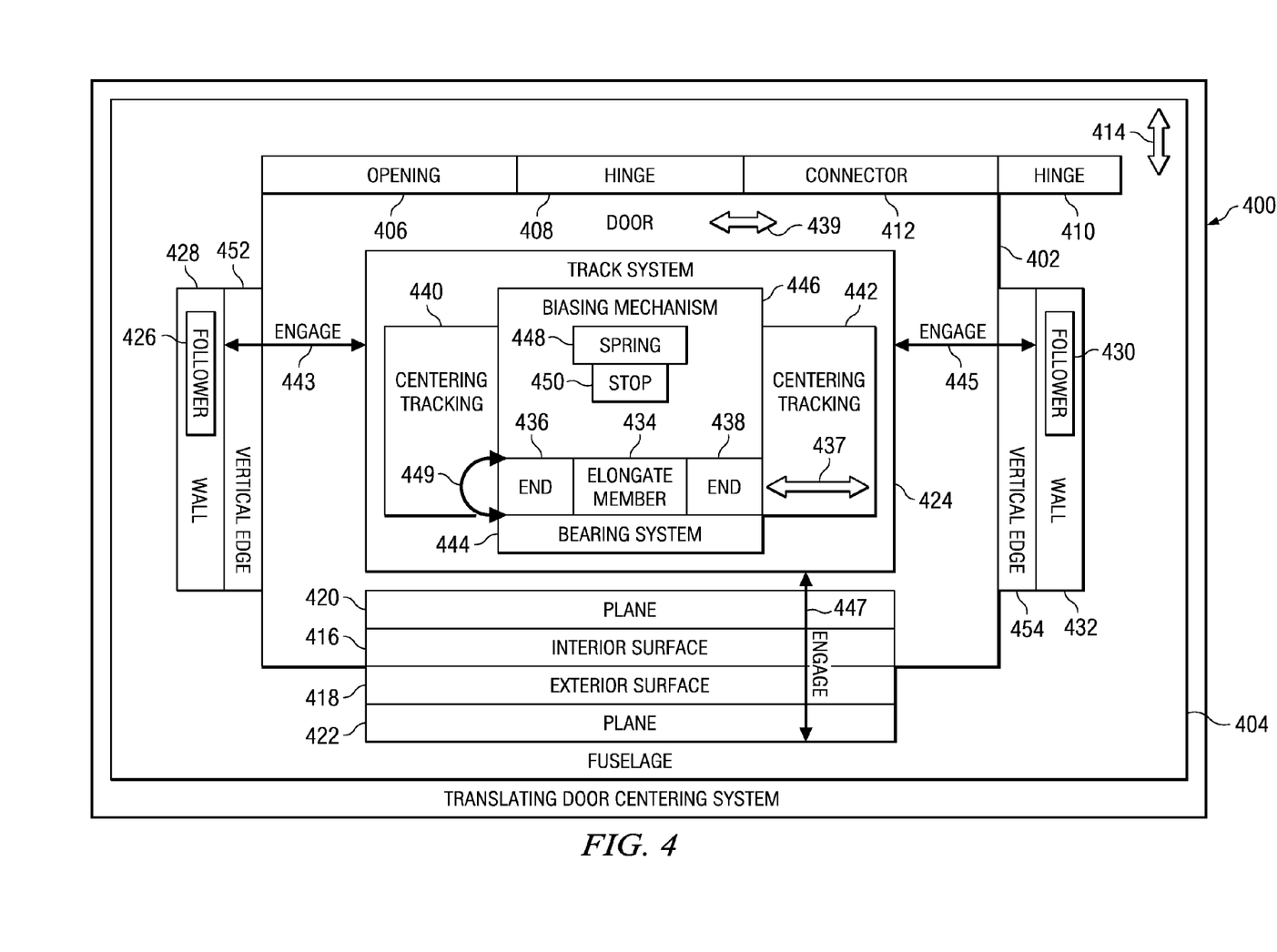
FIG. 4 is a block diagram of a translating door centering system in accordance with an advantageous embodiment.

With reference now to FIG. 4, a block diagram of a translating door centering system is depicted in accordance with an advantageous embodiment. In this example, translating door centering system 400 includes door 402, which may be attached to fuselage 404. Door 402 may provide a cover for opening 406 in fuselage 404. Door 402 may be a door, such as, for example, without limitation, door 316, door 318, door 320, and/or door 322 in FIG. 3.

In these examples, door 402 may be a translating door. Door 402 may have hinge 408, which may be connected to hinge 410 in fuselage 404 by connector 412. Hinge 408, connector 412, and hinge 410 may provide for a translating motion of door 402. In other words, door 402 may rotate around substantially vertical centerline 414 to move in a fashion in which interior surface 416 of door 402 faces exterior surface 418 of fuselage 404 while door 402 is opened and/or closed. Vertical centerline 414 may be, for example, without limitation, a line and/or axis that may be on and/or near hinge 408, hinge 410, and/or a parallel instant center of rotation. Door 402 may move in a manner such that plane 420 of door 402 may remain substantially perpendicular to plane 422 of fuselage 404.

In these different advantageous embodiments, track system 424 may be used to minimize and/or prevent rotational movement of door 402 about and/or around vertical centerline 414 when track system 424 is engaged with fuselage 404. In these examples, track system 424 may be engaged with follower 426 in wall 428 and follower 430 in wall 432 of fuselage 404.

In these advantageous embodiments, track system 424 may include elongate member 434, which may have end 436 and end 438. Elongate member 434 may be rotatably mounted to door 402 along axis 437, which may be substantially parallel to horizontal centerline 439. Track system 424 may be substantially parallel to horizontal centerline 439, in these examples. Horizontal centerline 439 may be a line and/or axis along which track system 424 may be aligned and/or positioned. Centering track 440 may be attached to end 436, while centering track 442 may be attached to end 438. Elongate member 434, along with centering tracks 440 and 442, may provide for centering or minimizing rotation of door 402 around vertical centerline 414, in these examples.

Follower 426 and follower 430 may be structural components that may engage centering track 440 and centering track 442, as shown by arrows 443 and 445, respectively. For example, without limitation, follower 426 and follower 430 may be a fixed cam, a fixed cam roller, a pin, or some other suitable mechanism.

Centering track 440 may engage follower 426, while centering track 442 may engage follower 430. Centering track 440 and centering track 442 may engage follower 426 and follower 430 during initial opening and/or final closing of door 402 relative to opening 406 in fuselage 404, as shown by arrow 447. The minimization or prevention of rotation of door 402 around vertical centerline 414 occurs while centering track 440 and centering track 442 are engaged with follower 426 and follower 430.

Further, elongate member 434 may be rotatably attached to door 402, as indicated by arrow 449 to allow for rotation of centering track 440 and centering track 442. Elongate member 434 may be attached to door 402 using bearing system 444. Bearing system 444 may be a set of bearings. A set, as used herein, refers to one or more items. For example, without limitation, a set of bearings is one or more bearings. Additionally, biasing mechanism 446 may be present in track system 424. Biasing mechanism 446 may bias and maintain centering track 440 and centering track 442 in a position to receive follower 426 and follower 430 when door 402 closes. In this example, biasing mechanism 446 may be comprised of spring 448 and stop 450. In other words, biasing mechanism 446 may position centering track 440 and centering track 442 into a position that allows follower 426 and follower 430 to engage centering track 440 and centering track 442 when closing door 402.

In this manner, rotational movement of door 402 about vertical centerline 414 may be reduced and/or eliminated using track system 424. Track system 424 may allow door 402 to maintain a relationship between vertical edge 452 and vertical edge 454 of door 402 relative to opening 406 in fuselage 404 during movement of door 402 while track system 424 is engaged with fuselage 404.

In particular, track system 424 may engage follower 426 and follower 430. In this manner, the different advantageous embodiments may provide this relationship by reducing and/or eliminating rotational movement of door 402 about vertical centerline 414. This mechanism may prevent contact between vertical edge 452 of door 402 and wall 428 and between vertical edge 454 of door 402 and wall 432 that may be caused by horizontal movement of door 402 during opening and/or closing of door 402. As illustrated, rotational movement of vertical edges 452 and 454 of door 402 relative to wall 428 and wall 432 may be reduced and/or eliminated using track system 424.

The illustration of translating door centering system 400 in FIG. 4 is provided for purposes of illustrating one manner in which an advantageous embodiment may be implemented. The illustration of translating door centering system 400 is not meant to imply physical or architectural limitations to the manner in which other advantageous embodiments may be implemented. For example, without limitation, door 402 may include additional components or other components in place of those illustrated. For example, in one implementation, door 402 also may include additional tracks and followers to aid in the movement of door 402. In other advantageous embodiments, track system 424 may include two sets of elongate members with centering tracks 440 and 442.

Figure 5:
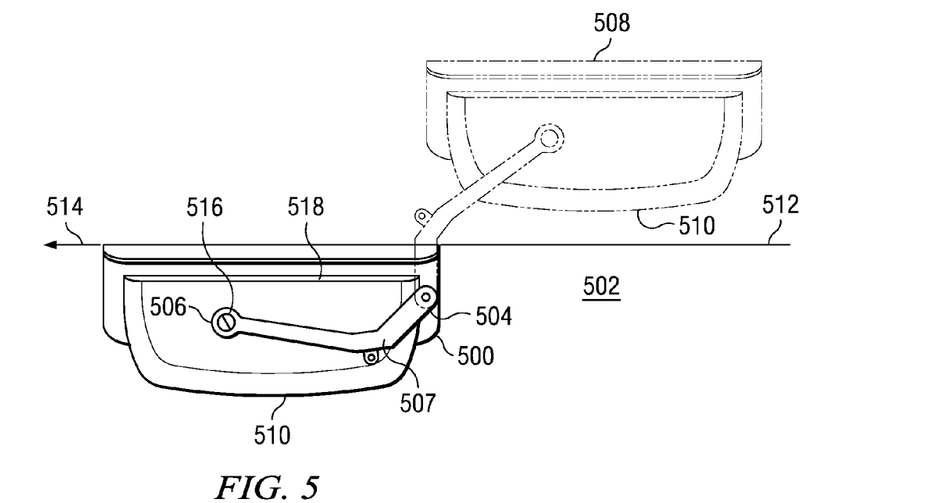
FIG. 5 is a diagram illustrating a translating door in accordance with an advantageous embodiment.

With reference now to FIG. 5, a diagram illustrating a translating door is depicted in accordance with an advantageous embodiment. In this example, door 500 is an example of one implementation of door 402 in FIG. 4.

In this example, a top view of door 500 is shown to illustrate translational movement of door 500. In this example, door 500 may be in a closed position with respect to fuselage 502. Door 500 may be connected to fuselage 502 by hinge 504 and hinge 506, which may be connected to each other through connector 507.

Door 500 may move with a translational and/or translating motion from the illustrated position to position 508 such that interior surface 510 of door 500 may be facing exterior surface 512 of fuselage 502. During this translational movement of door 500, door 500 may be maintained in a position parallel to line 514 of fuselage 502. Line 514 may be a fuselage outer mold line (OML), which may be the fuselage outer mold line of fuselage 502.

Movement of door 500 about an axis, such as, for example, without limitation, hinge axis 516, may be undesirable. Movement of door 500 about hinge axis 516 may cause door 500 to contact fuselage 502 and/or jam. In this example, track system 518 may reduce and/or prevent this type of movement of door 500.

Figure 6:
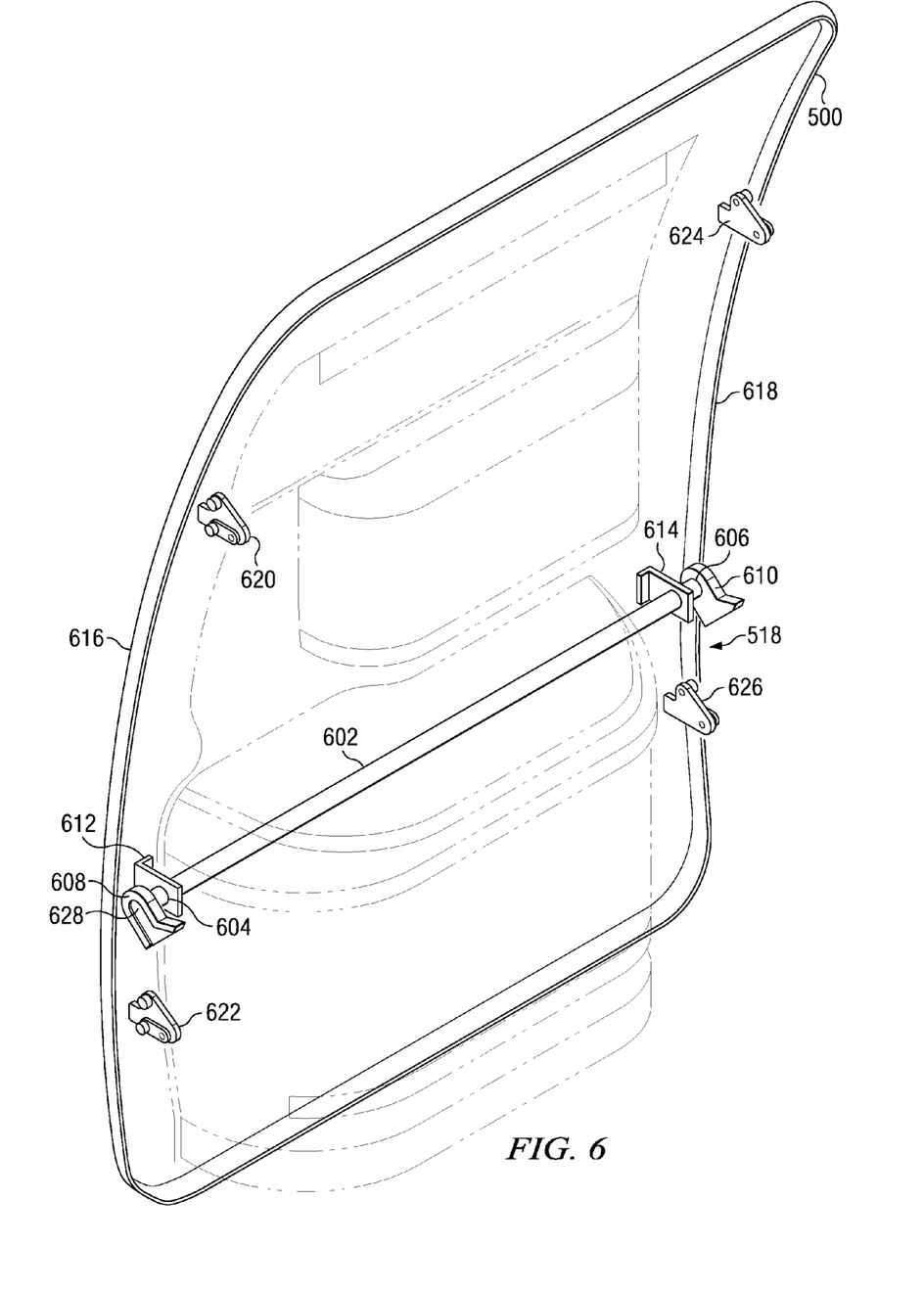
FIG. 6 is a diagram illustrating a track system in accordance with an advantageous embodiment.

With reference now to FIG. 6, a diagram illustrating a track system is depicted in accordance with an advantageous embodiment. In this example, track system 518 includes torque tube 602, which may have end 604 and end 606 attached to centering track 608 and centering track 610, respectively. Torque tube 602 may be attached to door 500 using bearing 612 and bearing 614.

Torque tube 602 may be an example of one implementation of elongate member 434 in FIG. 4. Torque tube 602 may be rotatably attached to door 500 using bearing 612 and bearing 614. Torque tube 602 may be a metal tube that may be rotated. Of course, other types of elongate members may be used in place of torque tube 602. Torque tube 602 may be made from various materials. These materials include, for example, without limitation, steel, aluminum, titanium, composite materials, or other suitable materials. Torque tube 602 may resist or limit an ability of door 500 to rotate, in these examples. Torque tube 602 may have a cross section shape that is selected from one of a circle or a polygon.

Further, other elongate members other than torque tube 602 may be used depending on the particular implementation. For example, without limitation, a rod, a stick, and/or some other elongate member may be used.

Centering track 608 may be located near vertical edge 616, while centering track 610 may be located near vertical edge 618 of door 500. Door 500 also may include follower 620 and follower 622, which may be located near vertical edge 616. Door 500 also may include follower 624 and follower 626, which may be located near vertical edge 618. A follower may be a mechanism that may be capable of engaging a track, a slot, a groove, or some other channel to guide and/or control movement of an object.

In these examples, centering track 608 may include bell shaped channel 628, which may receive a follower, similar to follower 622, located in the wall or edge of fuselage 502 (not shown in this illustration).

Figure 7:
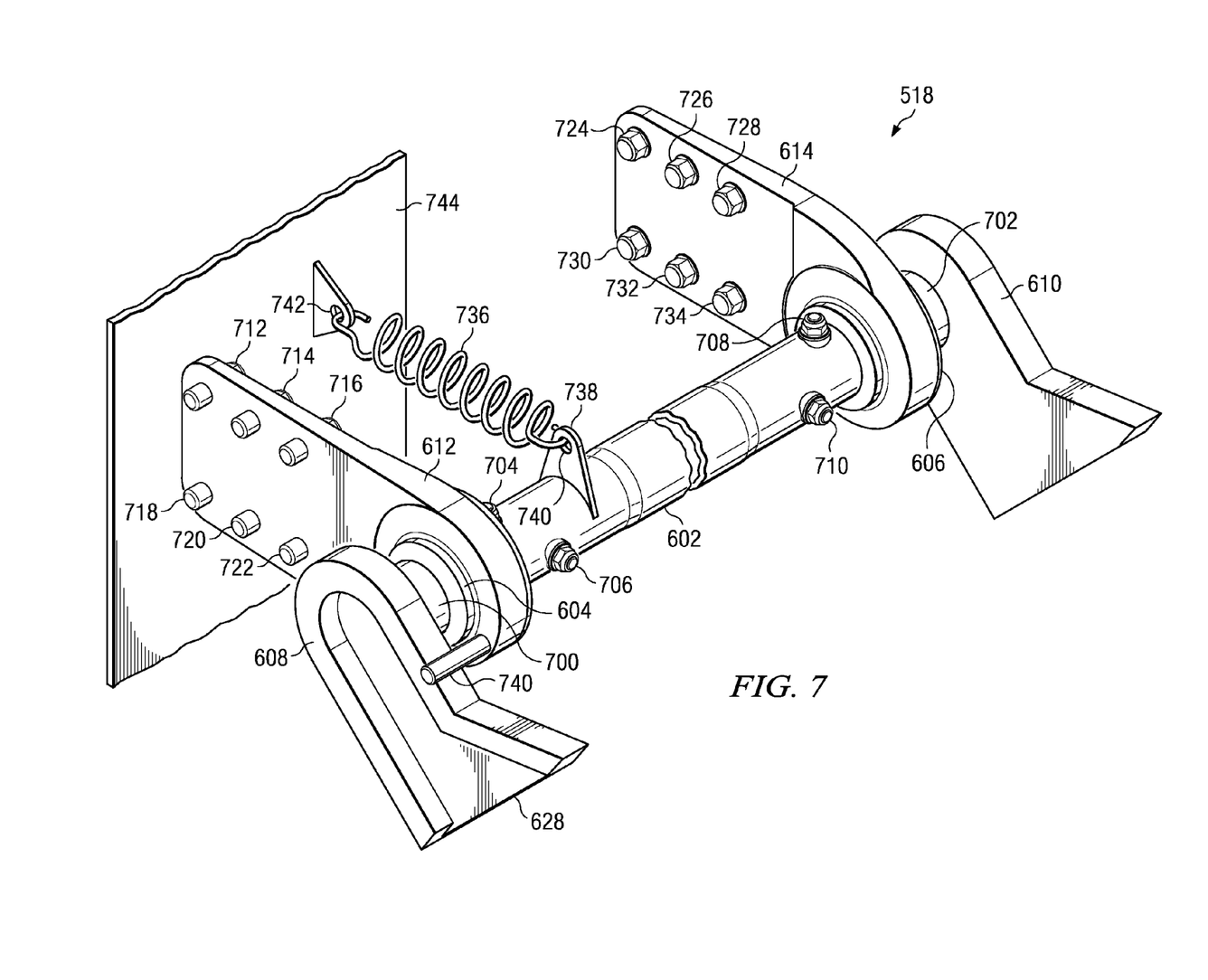
FIG. 7 is a more detailed illustration of a track system in accordance with an advantageous embodiment.

With reference now to FIG. 7, a more detailed illustration of a track system is depicted in accordance with an advantageous embodiment. In this example, centering track 608 in track system 518 may include elongate section 700, which may fit into end 604 of torque tube 602. In a similar fashion, centering track 610 also may include elongate section 702, which may fit into end 606 of torque tube 602.

When elongate section 700 is engaged with end 604 of torque tube 602, elongate section 700 may be secured to end 604 using fastener 704 and fastener 706. These fasteners may be, for example, without limitation, cross bolts, in these examples. In a similar fashion, when elongate section 702 is engaged with end 606, elongate section 702 may be secured to end 606 through fastener 708 and fastener 710.

Of course, other types of attachments other than cross bolts may be used. For example, without limitation, rivets, pins, screws, and other suitable fasteners may be used. Elongate section 702 may be secured to end 606 using other mechanisms such as, for example, without limitation, adhesive, splining, keying, crimping, welding, or other suitable mechanisms.

In these examples, bearing 612 may be secured to door 500 (not shown) using fasteners 712, 714, 716, 718, 720, and 722. Bearing 614 may be attached to door 500 using fasteners 724, 726, 728, 730, 732, and 734. Track system 518 may be biased and/or maintained in a selected position using tension spring 736 crank 738, and stop 740. End 742 of tension spring 736 may be attached to crank 738. End 742 may be attached to door edge frame 744. Tension spring 736 is an example of one implementation of biasing mechanism 446 in FIG. 4. Of course, the use of tension spring 736 and stop 740 is only one example implementation for biasing mechanism 446 in FIG. 4. Other mechanism also may be used. For example, without limitation, a torsion spring, a compression spring, or some other suitable biasing mechanism may be used.

With reference now to FIGS. 8-12, diagrams illustrating track and follower movement for a translational door centering system is depicted in accordance with an advantageous embodiment. In this example in FIG. 8, follower 620 and follower 622 may be attached to door 500 (not shown), while track 804 and track 806 are attached to fuselage 502 (not shown). Centering track 608 may be attached to torque tube 602 (not shown), which may be rotatably attached to door 500. Follower 810 may be located on the wall of fuselage 502 (not shown), in these examples.

Figure 8:
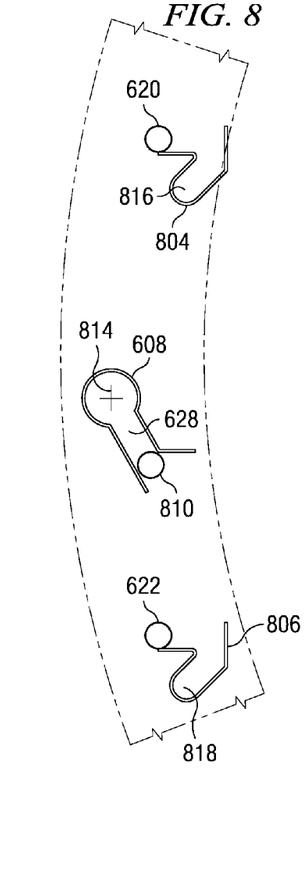
FIGS. 8-12 are diagrams illustrating track and follower movement for a translational door centering system in accordance with an advantageous embodiment.

Centering track 608 may have bell shaped channel 826. Bell shaped channel 628 may be a channel that may be wider at one end than another end. Bell shaped channel 628 may aid in receiving follower 810 into centering track 608, in these examples.

Centering track 608 may be rotatable about axis 814 in these examples. Track 804 may have channel 816 to receive follower 620. Track 806 may have channel 818 to receive follower 622. In FIG. 8, door 500 may be in an almost closed position, or some other position in which follower 620, follower 622, and follower 810 may begin to engage track 804, track 806, and centering track 608.

Figure 9:
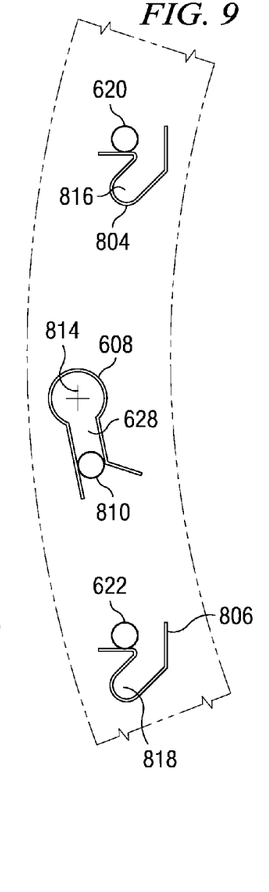

In FIG. 9, door 500 may be moved further towards a closed position. As can be seen, centering track 608 may engage follower 810, with centering track 608 moving to position follower 810 inwards into bell shaped channel 628. In these examples, centering track 608 may move downward and rotate as door 500 is lowered into a cutout. During this engagement, centering track 608 may rotate as illustrated about axis 814.

Figure 10:
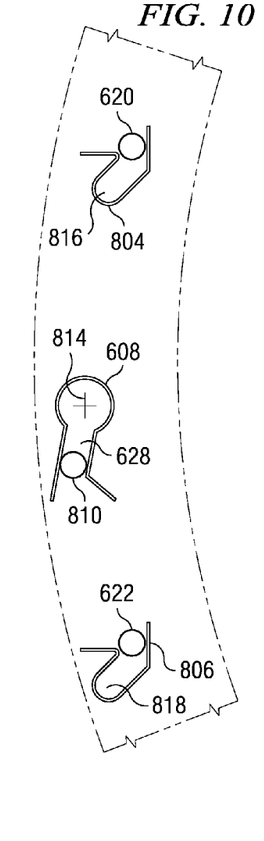
Figure 11:
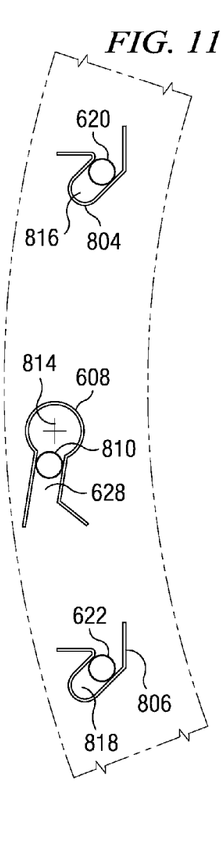
Figure 12:
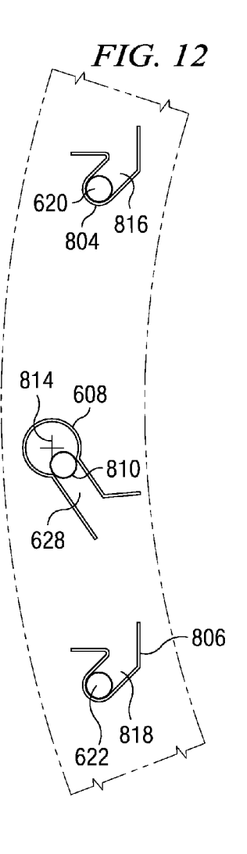

In FIG. 10, door 500 may be closed further with respect to an opening in the fuselage. As can be seen, centering track 608 may rotate further and/or move to position follower 810 inwards through bell shaped channel 628. In FIG. 11, door 500 may have begun a downward movement as part of the closing of door 500. With this movement, centering track 608 may further rotate and move, with follower 810 being positioned further into bell shaped channel 628. In this illustration, follower 620 may move further into channel 816 of track 804 and follower 622 may move further into channel 818 of track 806. In FIG. 12, the door may be in the closed position.

In opening door 500, a similar series of movements of followers and tracks may occur in the reverse order from FIG. 12 back towards FIG. 8. With this use of centering track 608, rotational movement of door 500 may be reduced and/or eliminated, while centering track 608 is engaged with follower 810. This track system also may include other tracks and followers such as track 804, track 806, follower 620, and follower 622.

Figure 13:
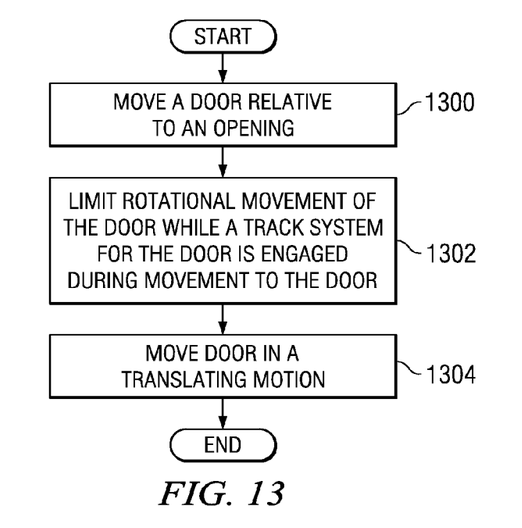
FIG. 13 is a flowchart of a process for moving a door in accordance with an advantageous embodiment.

With reference now to FIG. 13, a flowchart of a process for moving a door is depicted in accordance with an advantageous embodiment. The process illustrated in FIG. 13 may be implemented using translating door centering system 400 in FIG. 4.

The process begins by moving a door relative to an opening (operation 1300). This door may be a door, such as, for example, without limitation, door 402 with respect opening 406 in FIG. 4. The process limits rotational movement of the door, while a track system for the door is engaged during movement of the door (operation 1302). The door may then move in a translating motion (operation 1304), with the process terminating thereafter. The translating motion may be a closing and/or opening motion, in these examples. In operation 1302, the door may move with a translating motion in which edges of the door are guided by the track system in the manner described with respect to FIGS. 8-12 to reduce rotational movement during opening and/or closing of the door. In operation 1302, the track system may be, for example, without limitation, track system 424 in FIG. 4.

In this manner, the different advantageous embodiments may provide a method and apparatus for moving a door into a closed position and/or into an open position. The rotation or movement of the door may be limited and/or eliminated while the track system is engaged. In this manner, the vertical edges of a door may not contact the walls in the opening or other parts of an object, such as a fuselage of an aircraft.

The description of the different advantageous embodiments has been presented for purposes of illustration and description, and is not intended to be exhaustive or limited to the embodiments in the form disclosed. Many modifications and variations will be apparent to those of ordinary skill in the art.

Although the different advantageous embodiments have been described with respect to aircraft, other advantageous embodiments may be applied to other types of objects. For example, without limitation, other advantageous embodiments may be applied to a mobile platform, a stationary platform, a land-based structure, an aquatic-based structure, a space-based structure and/or some other suitable object. More specifically, the different advantageous embodiments may be applied to, for example, without limitation, a submarine, a bus, a train, an automobile, a spacecraft, and/or a surface ship.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a door configured to transition between an open position and a first closed position through rotational movement in a substantially horizontal direction and configured to move from the first closed position to a final closed position along a vertical axis;
    an elongate member having a first end and a second end, the elongate member rotatably mounted to the door along an axis that is substantially parallel to a substantially horizontal axis;
    a first centering track mounted on the first end;
    a second centering track mounted on the second end;
    a first follower attached to a vehicle proximate a first edge of the door; and
    a second follower attached to the vehicle proximate a second edge of the door, wherein the first centering track and the second centering track are movable to reduce rotational movement of the door about a vertical centerline during a movement of the door when the first follower is engaged in the first centering track and the second follower is engaged in the second centering track, wherein the first centering track is configured to engage the first follower and the second centering track is configured to engage the second follower, the first centering track and the second centering track rotate about the first follower and the second follower from the first closed position to the final closed position, and the door moves along the vertical axis.

2. The apparatus of claim 1, wherein the movement comprises a translational movement.

3. The apparatus of claim 1 further comprising:
    a set of bearings capable of being mounted to the door and capable of rotatably holding the elongate member.

4. The apparatus of claim 3 further comprising:
    a biasing mechanism capable of maintaining the first centering track and the second centering track in a position to receive the first follower and the second follower when closing the door.

5. The apparatus of claim 4, wherein the biasing mechanism comprises a spring and a stop.

6. The apparatus of claim 1, wherein the elongate member is a torque tube.

7. The apparatus of claim 6, wherein the torque tube has a cross section shape that is selected from one of a circle or a polygon.

8. The apparatus of claim 1, wherein in reducing the rotational movement of the door during the movement of the door, a relationship between a first vertical edge and a second vertical edge of the door to an opening is maintained during the movement of the door when the first follower is engaged in the first centering track and the second follower is engaged in the second centering track, and the rotational movement of the door around a second axis substantially parallel to a hinge axis is reduced.

9. The apparatus of claim 8, wherein the first centering track located at the first vertical edge comprises a bell channel configured to receive the first follower and a channel configured to engage the first follower so as to substantially restrict rotation of the door in the closed position and the second centering track is located at the second vertical edge.

10. The apparatus of claim 8, wherein the first follower is located in a first wall of an opening that is substantially parallel to the first vertical edge and the second follower is located in a second wall of the opening that is substantially parallel to the second vertical edge.

11. The apparatus of claim 8, wherein contact between the first vertical edge of the door and the second vertical edge of an opening caused by horizontal movement of the first vertical edge of the door is substantially prevented in the closed position.

12. The apparatus of claim 11 further comprising:
    a vehicle having the opening, wherein the door is a translating door.

13. The apparatus of claim 12, wherein the vehicle is selected from one of an aircraft, a submarine, a bus, a train, an automobile, a spacecraft, and a surface ship.

14. The apparatus of claim 1, wherein the door is configured such that an interior surface of the door is substantially parallel and proximate to an exterior surface of a fuselage of the vehicle in a fully open position.

15. The apparatus of claim 1 further comprising a first hinge, a connector, and a second hinge, wherein the first hinge is attached to the door and to the connector and the second hinge is attached to the door and a vehicle.

16. The apparatus of claim 1 further comprising:
    a third elongate member having a first end and a second end, the second elongate member rotatably mounted to the door along an axis that is substantially parallel to a horizontal centerline;

a third follower mounted on the first end of the third elongate member;
a fourth follower mounted on the second end of the third elongate member;
a third centering track attached to the vehicle proximate the first edge of the door and the third centering track configured to engage the third follower of the third elongate member; and
a fourth centering track attached to the vehicle proximate a second edge of the door and the fourth centering track configured to engage the fourth follower of the third elongate member.

17. An apparatus comprising:
a door having a first vertical edge and a second vertical edge, the door configured to rotationally transition between a first closed position and fully open position through a horizontal axis, and the door configured such that an interior surface of the door is substantially parallel and proximate to an exterior surface of a fuselage of a vehicle in the fully open position and the door further configured to move vertically with respect to the fuselage of the vehicle from the first closed position to a final closed position along a vertical axis;
a first hinge, a connector, and a second hinge, wherein the first hinge is attached to the door and to the connector and the second hinge is attached to the door and the vehicle, the first hinge, the connector, and the second hinge configured to transition the door between the open position and the closed position;
a torque tube having a first end and a second end rotatably mounted to the door along an axis that is substantially parallel to a horizontal centerline, wherein the torque tube has a cross section shape that is selected from one of a circle, a square, a triangle, and a hexagon;
a set of bearings mounted to the door and rotatably holding the torque tube;
a first centering track mounted on the first end, wherein the first centering track is located at the first vertical edge;
a second centering track mounted on the second end, wherein the second centering track is located at the second vertical edge;
a first follower located in a first wall in an opening in the vehicle that is substantially parallel to the first vertical edge, wherein the first centering track comprises a bell channel configured to receive the first follower and a channel configured to engage the first follower so as to substantially restrict rotation of the door in the final closed position;
a second follower located in a second wall in the opening of the vehicle that is substantially parallel to the second vertical edge, wherein the second centering track comprises a bell channel configured to receive the second follower and a channel configured to engage the second follower so as to substantially restrict rotation of the door in the final closed position;
wherein the first centering track is configured to engage the first follower and the second centering track is configured to engage the second follower, the first centering track and the second centering track rotate about the first follower and the second follower from the first closed position to the final closed position, and the door moves along the vertical axis with respect to the fuselage of the vehicle; and
a biasing mechanism maintaining the first centering track and the second centering track in a position to receive the first follower and the second follower when closing the door, the biasing mechanism comprising a spring and a stop.

18. The apparatus of claim 17 further comprising:
a second elongate member having a first end and a second end, the second elongate member rotatably mounted to the door along an axis that is substantially parallel to a horizontal centerline;
a third follower mounted on the first end of the second elongate member;
a fourth follower mounted on the second end of the second elongate member;
a third centering track attached to the vehicle proximate the first edge of the door and the third centering track configured to engage the third follower;
a fourth centering track attached to the vehicle proximate a second edge of the door and the fourth centering track configured to engage the fourth follower;
a third elongate member having a first end and a second end, the third elongate member rotatably mounted to the door along an axis that is substantially parallel to a horizontal centerline;
a fifth follower mounted on the first end of the third elongate member;
a sixth follower mounted on the second end of the third elongate member;
a fourth centering track attached to the vehicle proximate the first edge of the door and the fourth centering track configured to engage the fifth follower of the third elongate member; and
a sixth centering track attached to the vehicle proximate a second edge of the door and the sixth centering track configured to engage the sixth follower of the third elongate member.

* * * * *